United States Patent
You et al.

(10) Patent No.: US 8,675,552 B2
(45) Date of Patent: Mar. 18, 2014

(54) APPARATUS AND METHOD FOR TRANSMITTING INFORMATION VIA UPLINK CONTROL CHANNEL IN OFDMA COMMUNICATION SYSTEM

(75) Inventors: Hwa-Sun You, Suwon-si (KR); Hee-Won Kang, Seongnam-si (KR); Jae-Hee Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 866 days.

(21) Appl. No.: 12/696,018

(22) Filed: Jan. 28, 2010

(65) Prior Publication Data

US 2010/0189040 A1    Jul. 29, 2010

(30) Foreign Application Priority Data

Jan. 28, 2009 (KR) .................. 10-2009-0006701
Jan. 27, 2010 (KR) .................. 10-2010-0007422

(51) Int. Cl.
*H04W 4/00* (2009.01)

(52) U.S. Cl.
USPC ........................................ 370/328

(58) Field of Classification Search
USPC ......... 370/208–209, 328–329, 332, 333, 341, 370/431–432, 437
See application file for complete search history.

(56) References Cited

U.S. PATENT DOCUMENTS

| 2006/0009224 | A1* | 1/2006 | Lim et al. ...................... 455/442 |
| 2007/0076807 | A1* | 4/2007 | Jin et al. ......................... 375/260 |
| 2008/0080472 | A1* | 4/2008 | Bertrand et al. .............. 370/344 |
| 2011/0122875 | A1* | 5/2011 | Kataoka et al. ............ 370/395.6 |
| 2012/0201275 | A1* | 8/2012 | Tiirola et al. ................. 375/135 |

FOREIGN PATENT DOCUMENTS

EP        1988677 A2    11/2008
WO   WO 2008/120925 A1   10/2008

OTHER PUBLICATIONS

Extended European Search Report dated Sep. 10, 2012 in connection with European Patent Application No. 10152015.3.
NTT DoCoMo, et al; "PUCCH Structure Considering Sounding RS Transmission in E-UTRA Uplink"; 3GPP TSG RAN WG1 Meeting #50; Athens, Greece, Aug. 20-24, 2007,3 pages.
Texas Instruments; "Enhanced CQI Transmission with Cyclic Shift Selection"; 3GPP TSG RAN WG1 #51; Jeju, Korea, Nov. 5-9, 2007, 3 pages.

* cited by examiner

*Primary Examiner* — Kwang B Yao
*Assistant Examiner* — Tung Q Tran

(57) ABSTRACT

An apparatus is capable of transmitting information via an uplink control channel in an Orthogonal Frequency Division Multiple Access (OFDMA) communication system. Uplink control information is encoded to obtain a predetermined bit string. A signal sequence corresponding to the predetermined bit string is generated. The signal sequence is cyclic-shifted according to a predetermined rule. The cyclic-shifted signal sequence is controlled according to a subframe length. Therefore, reception performance deterioration of an uplink control channel allocated to an irregular subframe can be minimized.

28 Claims, 13 Drawing Sheets

APPARATUS AND METHOD FOR TRANSMITTING INFORMATION VIA UPLINK CONTROL CHANNEL IN OFDMA COMMUNICATION SYSTEM

CROSS-REFERENCE TO RELATED APPLICATION(S) AND CLAIM OF PRIORITY

The present application claims the benefit under 35 U.S.C. §119 to an application filed in the Korean Intellectual Property Office on Jan. 28, 2009 and assigned Serial No. 10-2009-0006701, and an application filed in the Korean Intellectual Property Office on Jan. 27, 2010 and assigned Serial No. 2010-7422, the contents of which are incorporated herein by reference.

TECHNICAL FIELD OF THE INVENTION

The present invention relates to an apparatus and a method for transmitting information via an uplink control channel in an Orthogonal Frequency Division Multiple Access (OFDMA) communication system. More particularly, the present invention relates to an apparatus and a method for transmitting uplink control information via an irregular uplink subframe.

BACKGROUND OF THE INVENTION

In an OFDMA communication system, a frame structure is illustrated in FIG. 1.

Referring to FIG. 1, a frame 100 has a length of 5 ms, and is divided into a downlink frame 110 and an uplink frame 120. A Tx/Rx Transition Gap (TTG) 115 is a gap between the downlink frame 110 and the uplink frame 120. A base station performs switching from a transmission mode to a reception mode, and terminals perform switching from the reception mode to the transmission mode during this gap. A Rx/Tx Transmission Gap (RTG) 125 is a gap between the uplink frame 120 and a downlink frame subsequently transmitted. A base station performs switching from the reception mode to the transmission mode, and terminals perform switching from the transmission mode to the reception mode during this gap.

In addition, the downlink frame 110 includes a plurality of subframes 130, and transmits downlink data and downlink control information. Similarly, the uplink frame 120 includes a plurality of subframes, and transmits uplink data and uplink control information.

Examples of the uplink control information include uplink fast feedback information, a hybrid Automatic Repeat Request (ARQ) feedback (or ACK) channel, bandwidth request indicator information for requesting a resource of an uplink, and the like.

The uplink fast feedback information may include various information such as a full Signal-to-Noise Ratio (SNR) or a Carrier-to-Interference Ratio (CIR), a Modulation and Coding Scheme (MCS) level favored by a terminal, Flexible Frequency Reuse (FFR) information, a beamforming index, and the like. When a data block received from a downlink by a terminal is not decodable, the hybrid ARQ feedback channel transmits 1-bit information in order to request retransmission. The bandwidth request indicator is used so that a plurality of terminals are allocated a specific signal sequence or transmit an arbitrary selected signal sequence by contention, and a base station may determine whether each terminal requests a bandwidth.

Since amounts of the uplink fast feedback information, uplink hybrid ARQ feedback information, and bandwidth information are not large but are very important information for an operation of a communication system, high reliability in transmission of them needs to be guaranteed. However, to prevent a resource waste, a frequency-time axis resource is not allocated much to a physical channel for transmitting them in general. Therefore, for reliable transmission, an efficient modulation/demodulation method is desired.

In the conventional OFDMA communication system, to transmit/receive the uplink fast feedback information, the hybrid ARQ feedback information, and the bandwidth request indicator information, a non-coherent modulation/demodulation method that does not use channel estimation is used. In addition, to secure high reliability of the fast feedback information, a frequency diversity gain is obtained by transmitting the information via a plurality of different frequency resources.

Generally, one frame 110 includes forty-eight OFDM symbols, and a ratio of downlink frame:uplink frame is 5:3. The downlink frame 110 includes thirty OFDM symbols, and the uplink frame 120 includes eighteen OFDM symbols. Here, one subframe 130 includes six OFDM symbols.

Depending upon the situation, the one frame 110 includes forty-two OFDM symbols, and a ratio of downlink frame:uplink frame is 27:15. The downlink frame 110 includes twenty-seven OFDM symbols, and the uplink frame 120 includes fifteen OFDM symbols. In an irregular uplink frame structure, one uplink subframe includes five OFDM symbols.

Therefore, to apply a signal sequence for uplink control information to the conventional uplink frame structure (that is, in the case where one uplink subframe includes 6 OFDM symbols) in an irregular uplink frame structure, a portion of the signal sequence needs to be punctured or repeated. Accordingly, orthogonality/correlation between codes may be distorted, and serious performance deterioration may occur. In addition, since a portion of the signal sequence needs to be repeated, a resource efficiency is lowered.

SUMMARY OF THE INVENTION

To address the above-discussed deficiencies of the prior art, it is a primary aspect of the present invention to solve at least the above-mentioned problems and/or disadvantages and to provide at least the advantages described below. Accordingly, an aspect of the present invention is to provide an apparatus and a method for transmitting information via an uplink control channel in an OFDMA communication system.

Another aspect of the present invention is to provide an apparatus and a method for transmitting uplink control information via an uplink resource of an irregular subframe having a varied length in an OFDMA communication system.

Still another aspect of the present invention is to provide an apparatus and a method for minimizing performance deterioration even when a size of an available resource does not coincide with a size of a signal sequence for non-coherent modulation/demodulation in an OFDMA communication system.

In accordance with an aspect of the present invention, a method for transmitting information via an uplink control channel in an Orthogonal Frequency Division Multiple Access (OFDMA) communication system is provided. The method includes encoding uplink control information to obtain a predetermined bit string, generating a signal sequence corresponding to the predetermined bit string, cyclic-shifting the signal sequence according to a predetermined rule, and controlling the cyclic-shifted signal sequence according to a subframe length.

In accordance with another aspect of the present invention, a method for transmitting information via an uplink control channel in an Orthogonal Frequency Division Multiple Access (OFDMA) communication system is provided. The method includes encoding uplink control information to obtain a predetermined bit string, generating a signal sequence corresponding to the predetermined bit string, cyclic-shifting the generated signal sequence differently according to a plurality of subcarrier groups and mapping the signal sequence to the plurality of subcarrier groups, and controlling the signal sequence mapped to the plurality of subcarrier groups, respectively, so that the mapped signal sequence is suitable for an irregular subframe length.

In accordance with still another aspect of the present invention, a method for transmitting information via an uplink control channel in an Orthogonal Frequency Division Multiple Access (OFDMA) communication system is provided. The method includes encoding uplink control information to obtain a predetermined bit string and generating a signal sequence of a regular subframe length corresponding to the predetermined bit string, determining whether to map the signal sequence to an irregular subframe or whether to map the signal sequence to a regular subframe, when mapping the signal sequence to the irregular subframe, cyclic-shifting the generated signal sequence differently according to a plurality of subcarrier groups and mapping the signal sequence to the plurality of subcarrier groups, and controlling the signal sequence mapped to the plurality of subcarrier groups, respectively, such that the mapped signal sequence is suitable for an irregular subframe length.

In accordance with yet another aspect of the present invention, an apparatus for transmitting information via an uplink control channel in an Orthogonal Frequency Division Multiple Access (OFDMA) communication system is provided. The apparatus includes a channel encoder that encodes uplink control information to obtain a predetermined bit string, a signal sequence generator that generates a signal sequence corresponding to the predetermined bit string, a signal sequence cyclic shifter that cyclic-shifts the signal sequence according to a predetermined rule, and a subcarrier mapping unit that controls the cyclic-shifted signal sequence so that the signal sequence is suitable for an irregular subframe length.

In accordance with yet another aspect of the present invention, an apparatus for transmitting information via an uplink control channel in an Orthogonal Frequency Division Multiple Access (OFDMA) communication system is provided. The apparatus includes a channel encoder that encodes uplink control information to obtain a predetermined bit string, a signal sequence generator that generates a signal sequence corresponding to the predetermined bit string, a plurality of signal sequence cyclic shifters that cyclic-shifts the generated signal sequence differently depending on a plurality of subcarrier groups and maps the signal sequence to the plurality of subcarrier groups, and a plurality of subcarrier mapping unit that controls the signal sequence mapped to the plurality of subcarrier groups such that the signal sequence is suitable for an irregular subframe length.

In accordance with still yet another aspect of the present invention, a method for operating a receiver in order to receive information via an uplink control channel in an Orthogonal Frequency Division Multiple Access (OFDMA) communication system is provided. The method includes separating a subcarrier signal of at least one tile structure in which signal sequences corresponding to uplink control information are received from a frequency domain, recovering an order of the signal sequences corresponding to the uplink control information for each subcarrier signal of the at least one tile structure, and performing correlation on the recovered signal sequence.

In accordance with still yet another aspect of the present invention, a method for operating a receiver in order to receive information via an uplink control channel in an Orthogonal Frequency Division Multiple Access (OFDMA) communication system is provided. The method includes separating a subcarrier signal of at least one tile structure in which signal sequences corresponding to uplink control information are received from a frequency domain, recovering an order of the signal sequences corresponding to the uplink control information for each subcarrier signal of the at least one tile structure, and separating an index and a phase difference vector of an orthogonal subsignal sequence with respect to the recovered signal sequence.

In accordance with still another aspect of the present invention, a receiver that receives information via an uplink control channel in an Orthogonal Frequency Division Multiple Access (OFDMA) communication system is provided. The receiver includes a feedback resource extractor that separates a subcarrier signal of at least one tile structure in which signal sequences corresponding to uplink control information are received from a frequency domain, a signal sequence extractor that recovers an order of the signal sequences corresponding to the uplink control information for each subcarrier signal of the at least one tile structure, and a signal sequence correlater that performs correlation on the recovered signal sequence.

In accordance with still another aspect of the present invention, a receiver that receives information via an uplink control channel in an Orthogonal Frequency Division Multiple Access (OFDMA) communication system is provided. The receiver includes a feedback resource extractor that separates a subcarrier signal of at least one tile structure in which signal sequences corresponding to uplink control information are received from a frequency domain, a signal sequence extractor that recovers an order of the signal sequences corresponding to the uplink control information for each subcarrier signal of the at least one tile structure, and a unit that separates an index and a phase difference vector of the recovered signal sequence.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF THE INVENTION

FIGS. 2 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Preferred embodiments of the present invention will be described herein below with reference to the accompanying drawings. In the following description, well-known functions or constructions are not described in detail since they would obscure the invention in unnecessary detail. Terminologies described below are defined with consideration of functions in the present invention, and can change depending on the intention or practice of a user or operator. Therefore, the definitions should be determined on the basis of the descriptions over the specification.

Exemplary embodiments of the present invention provide a transmission apparatus and method for an uplink control channel where asynchronous detection is used via a subframe having an irregular length in an OFDMA communication system.

Figure 1:
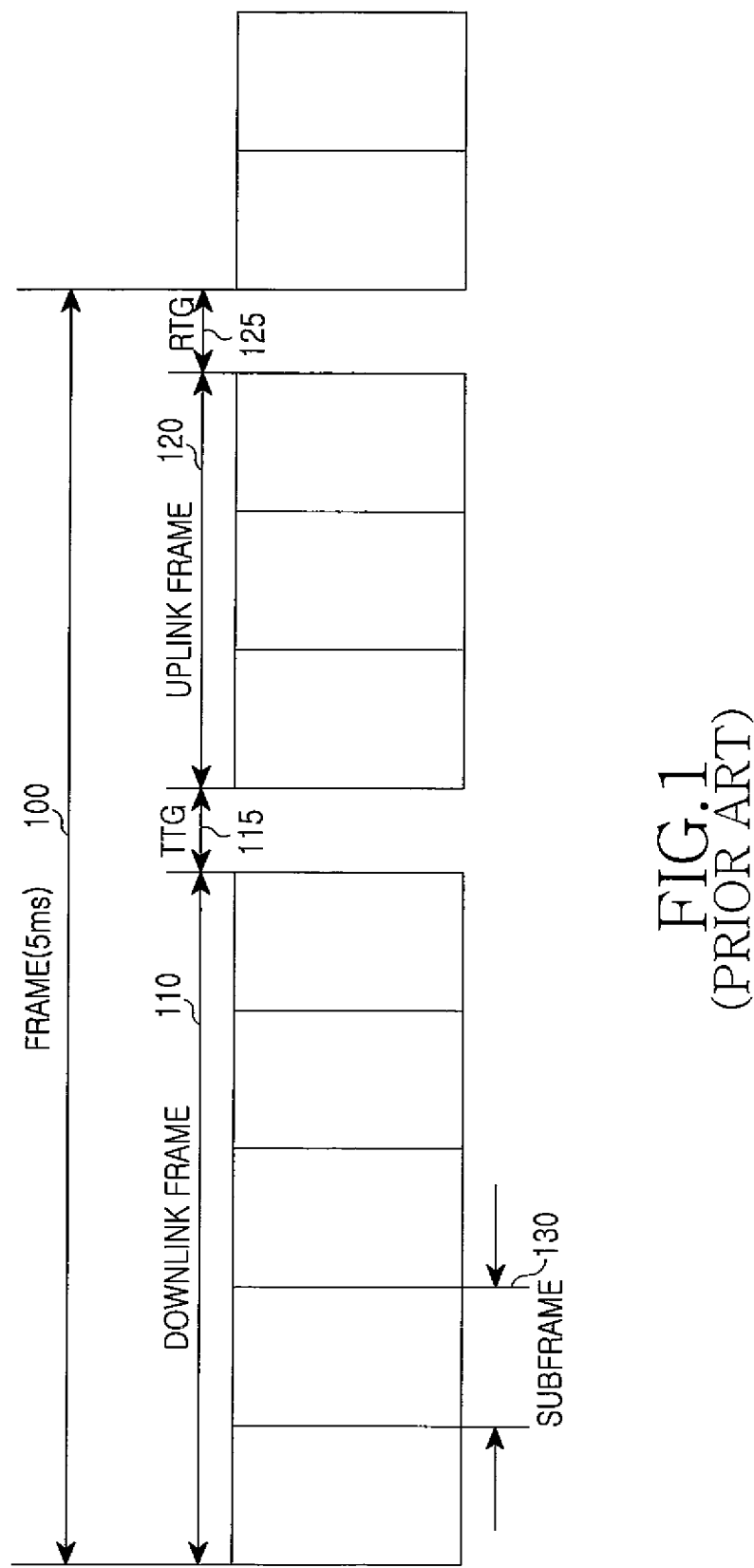
FIG. 1 illustrates a frame structure in an OFDMA communication system.

In the OFDMA communication system, for efficient operation and allocation of a wireless resource, a hierarchical structure in which a plurality of neighbor OFDM symbols are grouped into a subframe (or referred to as a slot), and a plurality of subframes are grouped into a frame is provided as illustrated in FIG. 1. More particularly, a subframe includes several OFDM symbols and represents a minimum unit of wireless resource allocation that can be divided in a time axis.

Generally, the subframe is designed to have a predetermined length. For example, according to an Institute of Electrical and Electronics Engineers (IEEE) 802.16 standard, not only various frequency bands are used depending on a service provider, but also various ratios of an uplink frame and a downlink frame are used in a Time Division Duplex (TDD) mode. Therefore, it is difficult to ensure that all subframes have a predetermined length. In addition, to support a relay zone or an uplink sounding channel, one or two symbols of uplink subframes may not be allocated.

Each uplink control channel may be transmitted via subcarrier groups of various sizes depending on an amount of information and a multiplexing method. However, for an efficient use of a resource, a subframe or a subcarrier group (referred to as a tile structure hereinafter) inside a slot used for data transmission is generated by dividing a frame by integer multiple on a frequency-time axis.

For more detailed exemplary embodiments, a quasi-orthogonal signal sequence for a bandwidth request is mapped to a 6×6-tile structure inside a subframe including six OFDM symbols, and the case of using three or more 6×6-tile structures in order to maintain frequency diversity gain is considered.

Figure 2:
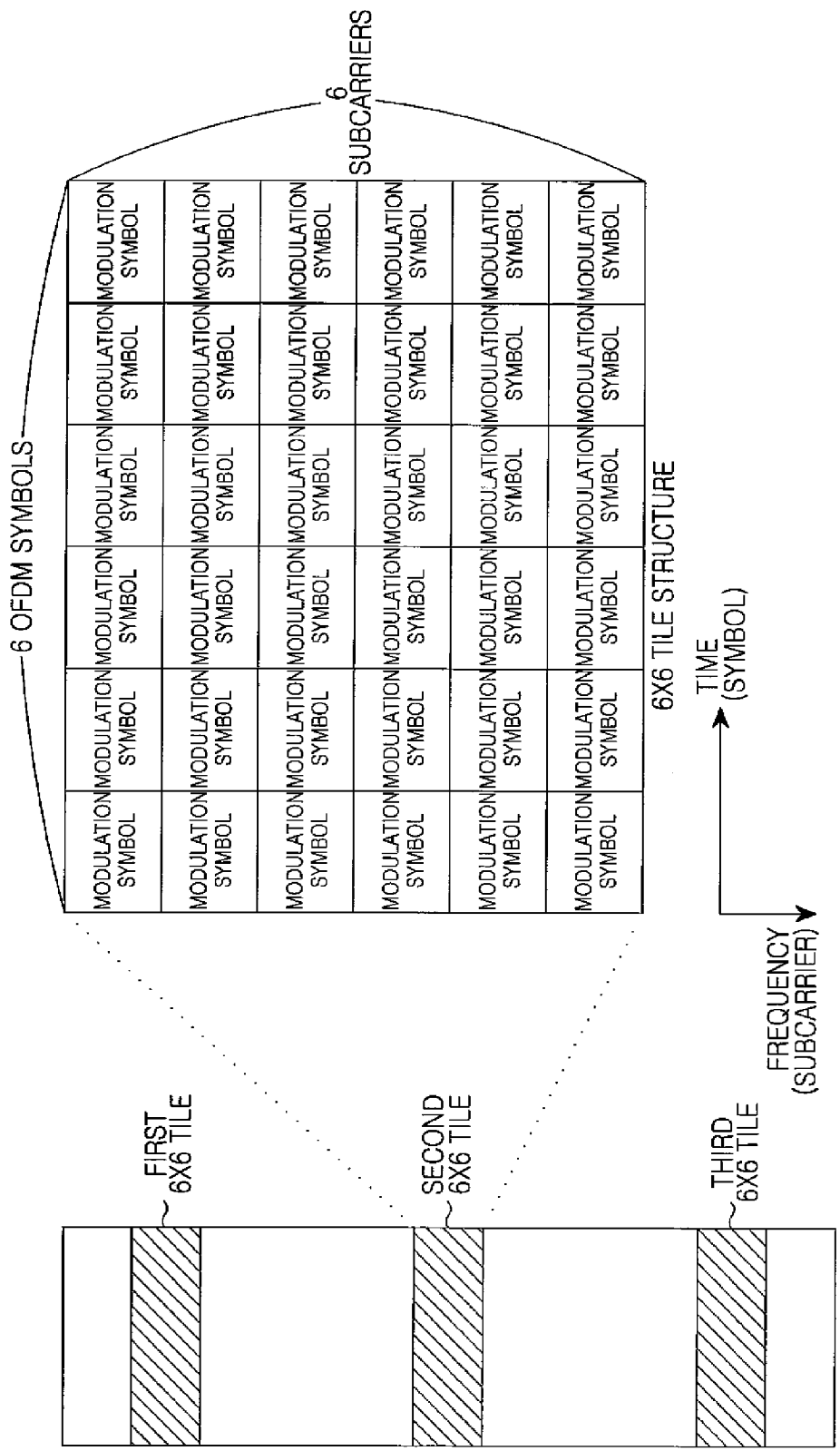
FIG. 2 illustrates a structure of 6×6 subcarrier group resources on a frequency-time axes.

At this point, for an uplink control channel, a 6×6 tile structure inside a subframe or a slot is separated and generated in an integer multiple. For example, FIG. 2 illustrates a frequency-time axis resource allocated for transmission of an uplink control channel in case where three 6×6-tile structures on a frequency-time axis are allocated, and FIG. 3 illustrates the case where three 2×6-tile structures on a frequency-time axis are allocated to an uplink control channel.

Uplink control channels such as a fast feedback channel, a hybrid ARQ channel, and a bandwidth request channel are designed such that asynchronous detection that performs detection without separate channel estimation is possible. An uplink control channel is modulated using a predetermined orthogonal or quasi-orthogonal signal sequence depending on a tile size. That is, in the case where three 6×6-tile structures inside a subframe or a slot are allocated as in FIG. 2, an orthogonal or quasi-orthogonal signal sequence having a length of '36' is repeatedly used every 6×6-tile structure. In the case where three 2×6-tile structures are allocated as in FIG. 3, an orthogonal or quasi-orthogonal signal sequence having a length of '12' or less is repeatedly used every 2×6-tile structure.

Figure 3:
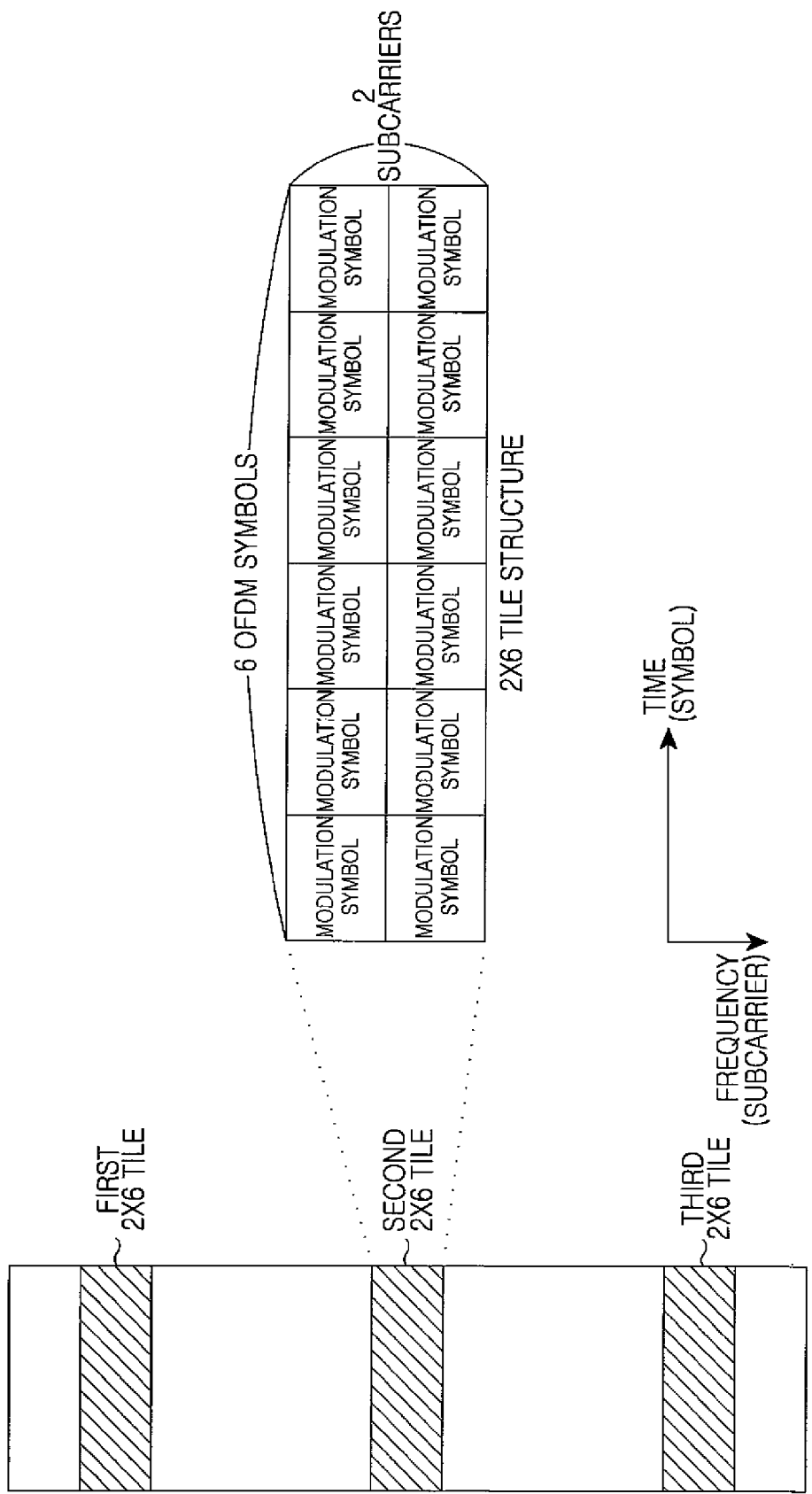
FIG. 3 illustrates a structure of 2×6 subcarrier group resources on a frequency-time axes.
Figure 4:
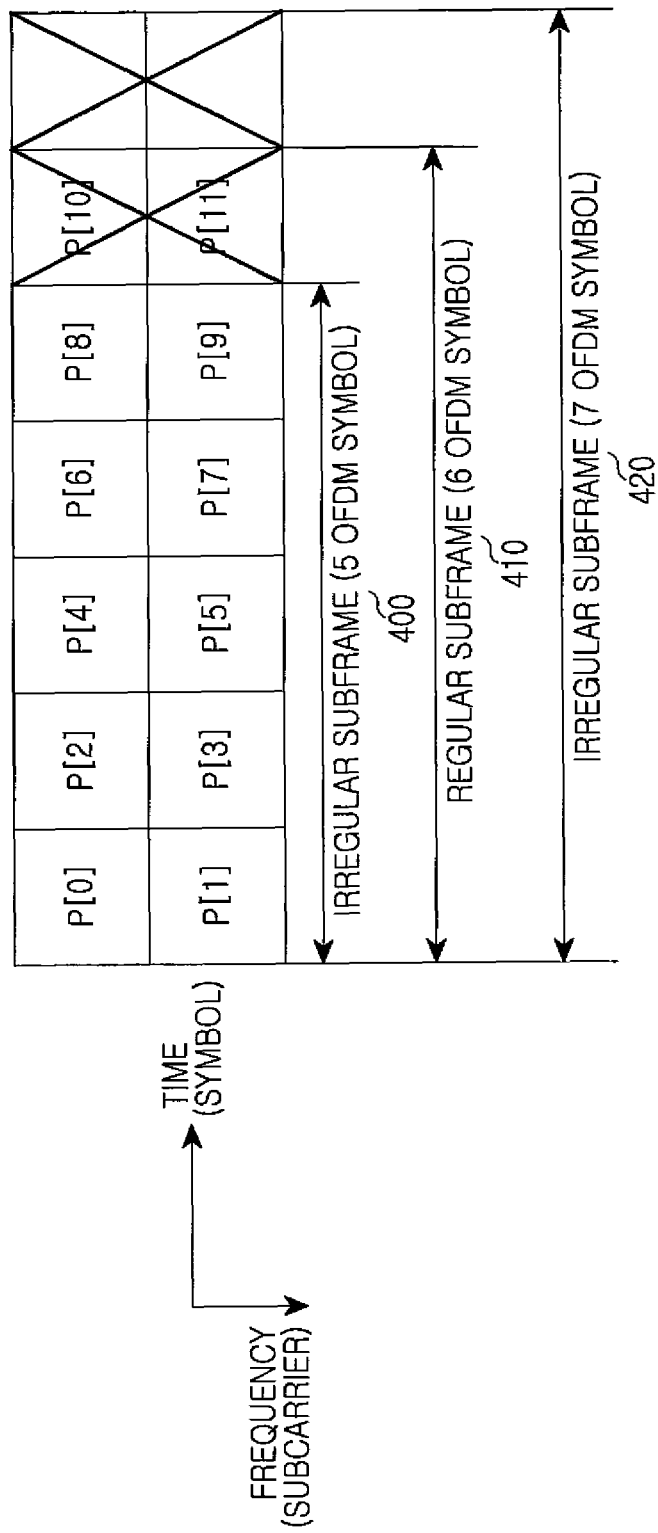
FIG. 4 illustrates an orthogonal signal sequence whose length is 12 corresponds to a 2×6 frequency-time axis resource.

An example of mapping uplink control channel information such as a fast feedback channel and a hybrid ARQ channel via a 2×6-tile structure illustrated in FIG. 3 using an orthogonal/quasi-orthogonal signal sequence defined in advance between a transmission end and a reception end is illustrated in FIG. 4.

FIG. 4 illustrates an orthogonal signal sequence having a length of '12' that corresponds to a 2×6 frequency-time axis resource.

Referring to FIG. 4, since a selected signal sequence is generated using six symbols such as a regular subframe 410, the signal sequence has a length ranging from P[0] to P[11], but in the case where a subframe to which a relevant uplink control channel has been allocated is an irregular subframe 400 including five symbols, signal sequences from P[0] to P[9] may be mapped to a frequency tone, but P[10] and P[11] cannot be mapped. In this case, more particularly, in the case of a hybrid ARQ channel that performs Code Division Multiplexing (CDM) in order to raise a frequency efficiency of a signal of multiple users, since orthogonality between users cannot be maintained, reception performance of control channel information cannot be guaranteed. Conversely, in the case of seven symbol-irregular subframe 420 having a length longer than that of a regular subframe, since fourteen frequency tones are allocated, twelve signal sequences from P[0] to P[11] are allocated and two frequency tones are left.

Figure 5:
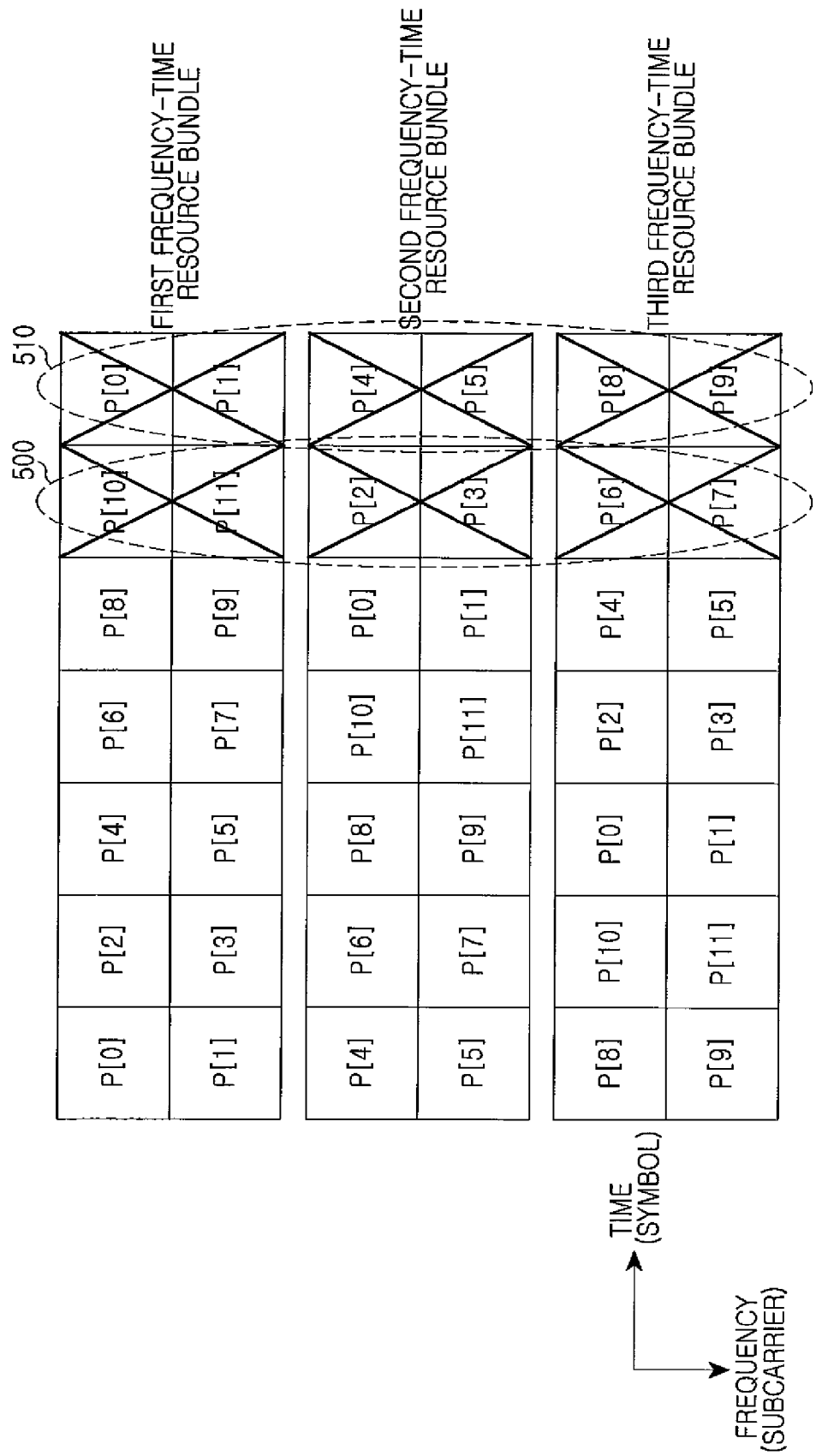
FIG. 5 illustrates mapping uplink control channel information in an irregular subframe according to an exemplary embodiment of the present invention.

FIG. 5 illustrates mapping uplink control channel information in an irregular subframe according to an exemplary embodiment of the present invention.

Uplink control information (fast feedback information, hybrid ARQ information, bandwidth request information, and so forth) is mapped to a predetermined signal sequence, and the predetermined signal sequence is mapped to a resource on a relevant frequency-time axis.

That is, in the case where three 6×6-tile structures are allocated as in FIG. 2, an orthogonal or quasi-orthogonal signal sequence having a length of '36' is repeatedly used every 6×6-tile structure. In the case where three 2×6-tile structures are allocated as in FIG. 3, an orthogonal or quasi-orthogonal signal sequence having a length of '12' or less is repeatedly used every 2×6-tile structure. Here, an orthogonal or quasi-orthogonal signal sequence is repeatedly used every 2×6-tile structure in order to obtain a frequency diversity gain with respect to transmission/reception of uplink control channel information.

As described above, uplink control information is repeatedly transmitted via a plurality of time-frequency resources having a tile structure. At this point, an orthogonal/quasi-orthogonal signal sequence mapped to a time-frequency resource is cyclic-shifted with respect to an irregular subframe. In the case where cyclic shift is performed differently for each tile structure, even when uplink control channel information is transmitted via an irregular subframe, deterioration of reception performance may be reduced.

Referring to FIG. 5, a signal sequence of uplink control information having a length of '12' in an irregular subframe having a length of '5' OFDM symbols or '7' OFDM symbols, not a '6' OFDM symbol-regular subframe that can include a 2×6-subcarrier group, is mapped. In the case of transmitting uplink control information via three subcarrier groups, twelve signal sequences from P[0] to P[11] in a first tile structure are sequentially mapped. In a second tile structure, cyclic shift is applied by as much as four, and eight signal sequences from P[4] to P[11] are sequentially mapped. Signal sequences are mapped from P[0] again by the residual required length. That is, in the case of an irregular subframe having a length of five symbols, signal sequences are mapped in an order of {P[4], P[5], P[6], P[7], P[8], P[9], P[10], P[11], P[0], P[1]}. In a third subcarrier group, cyclic shift is applied by as much as '8' in the same method, and signal sequences are mapped in an order of {P[8], P[9], P[10], P[11], P[0], P[1], P[2], P[3], P[4], P[5]}. By this mapping method, in the first tile structure, P[10] and P[11] cannot be transmitted, in the second tile structure, P[2] and P3] cannot be transmitted, and in the third subcarrier group, P[6] and P[7] cannot be transmitted (500). However, when all of the three tile structures are received, signal sequences not transmitted may be recovered.

When the same method is applied to 7 OFDM symbol-subframe, instead of loss generation, in the first tile structure, P[0] and P[1] are transmitted one more time. In the second tile structure, P[4] and P[5] are transmitted one more time. In a third tile structure, P[8] and P[9] are transmitted one more time. Therefore, a gain may be maximized 510. A specific order in which a signal sequence representing uplink control channel information corresponds to a time-frequency resource, and an amount of cyclic shift of a signal sequence applied to each tile structure may be properly selected depending on a realization method.

For example, values for a cyclic shift of a signal sequence may be determined depending on a random variable for each tile structure. That is, in the first tile structure, cyclic shift may start from P[1] depending on a random variable. In the second tile structure, cyclic shift may start from P[5] depending on a random variable. In the third tile structure, cyclic shift may start from P[9] depending on a random Variable.

For another example, values for a cyclic shift of a signal sequence may be given by Equation (1).

$$C[k]=P[\mod(k+\text{offset}*(t-1),m)] \quad \text{[Eqn. 1]}$$

In Equation 1, P[k] denotes a signal sequence, C[k] denotes a signal sequence applied to a cyclic shift, k denotes index of a modulation symbol, mod [i,j] denotes a module operation that returns a remainder when i is divided by j, t demote tile index, "offset" denotes offset value for a cyclic shift, and m denote a size of a signal sequence mapped to a subframe. m is 12 in IEEE 802.16 standard. The m is given as system parameter or by signaling procedure between a transmitter and a receiver.

Figure 6:
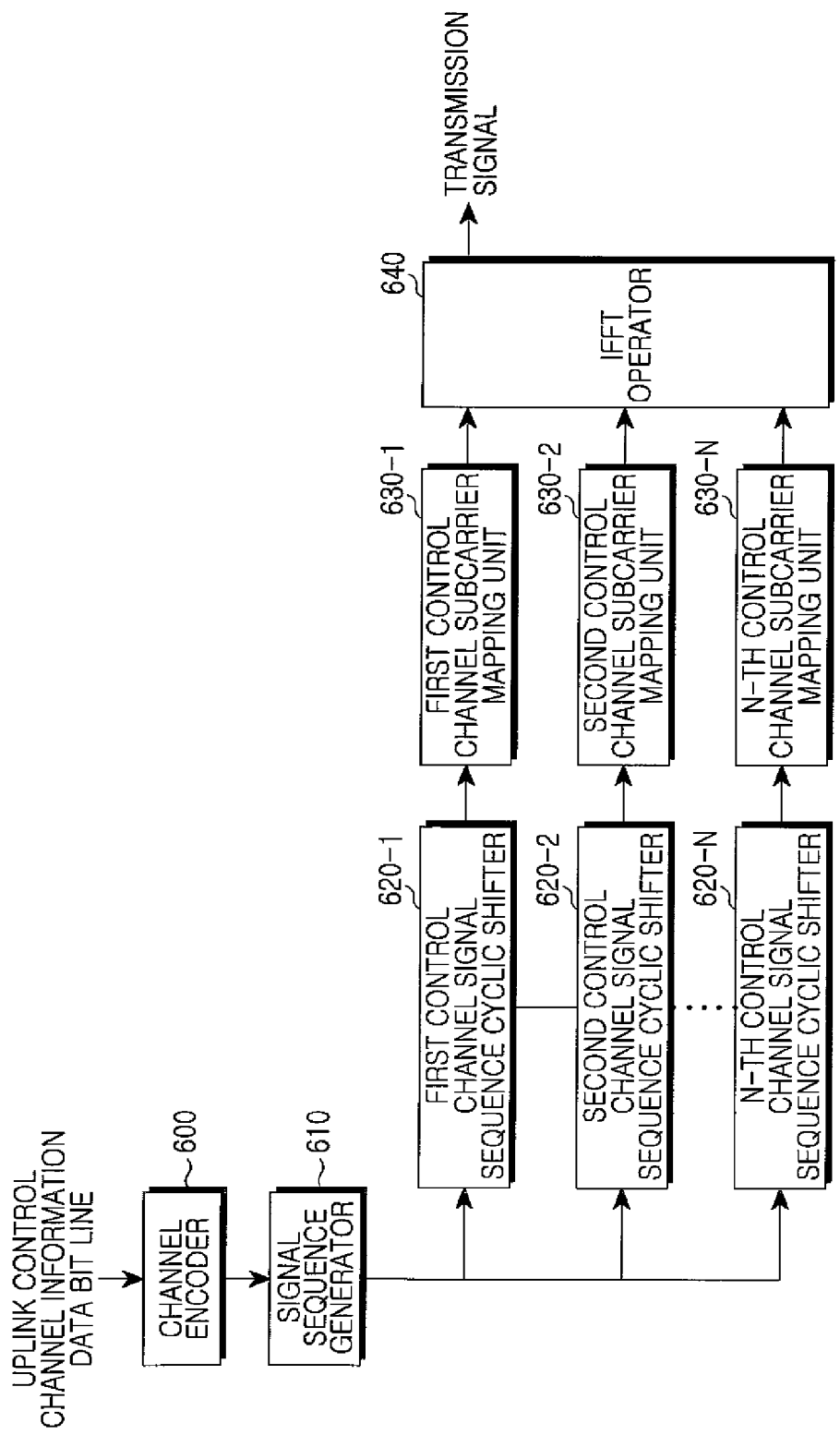
FIG. 6 illustrates a transmitter for transmitting information via an uplink control channel in an OFDMA communication system according to an exemplary embodiment of the present invention.

FIG. 6 illustrates a transmitter that transmits information via an uplink control channel in an OFDMA communication system according to an exemplary embodiment of the present invention.

Referring to FIG. 6, the transmitter includes a channel encoder 600, a signal sequence generator 610, N control channel signal sequence cyclic shifters 620_1 to 620_N, N control channel subcarrier mapping units 630_1 to 630_N, and an Inverse Fast Fourier Transform (IFFT) operator 640.

The channel encoder 600 encodes uplink control channel information such as fast feedback, a hybrid ARQ, and bandwidth request information to obtain a predetermined bit, and provides the bit to the signal sequence generator 610.

The signal sequence generator 610 generates an orthogonal or quasi-orthogonal signal sequence corresponding to the uplink control channel information bit string, and outputs the signal sequence to the N control channel signal sequence cyclic shifters 620_1 to 620_N. The orthogonal or quasi-orthogonal signal sequence is permutation of modulation symbols by a relevant modulation scheme (for example, Binary Phase Shift Keying (BPSK), Quadrature Phase Shift Keying (QPSK)).

The N control channel signal sequence cyclic shifters 620_1 to 620_N cyclic-shift orthogonal or quasi-orthogonal signal sequences from the signal sequence generator by applying different shift values to the signal sequences, and provide the cyclic-shifted signal sequences to the subcarrier mapping units 630_1 to 630_N, respectively. For example, the signal sequence cyclic shifter 620_1 determines to map a signal sequence to a subcarrier from a first modulation symbol P[0] or a second P[1] of the signal sequence depending on an index of a tile structure mapped to the subcarrier. The signal sequence cyclic shifter 620_2 determines to map a signal sequence to a subcarrier from a third modulation symbol P[2] or a fourth P[3] of the signal sequence depending on an index of a tile structure mapped to the subcarrier. The signal sequence cyclic shifter 620_N determines to map a signal sequence to a subcarrier from an (N−2)-th modulation symbol P[N−2] or an (N−1)-th P[N−1] of the signal sequence depending on an index of a tile structure mapped to the subcarrier.

The N control channel subcarrier mapping units 630_1 to 630_N perform an operation such that orthogonal or quasi-orthogonal signal sequences that have been cyclic-shifted by the N control channel signal sequence cyclic shifters 620_1 to 620_N correspond to an allocated tile structure. That is, the first subcarrier mapping unit 630_1 maps a signal sequence cyclic-shifted by the signal sequence cyclic shifter 620_1 to the first tile structure to generate a subchannel. In addition, the N-th subcarrier mapping unit 630_N maps a signal sequence cyclic-shifted by the signal sequence cyclic shifter 620_N to an N-th tile structure to generate a subchannel. At this point, the subcarrier mapping units 630_1 to 630_N puncture or repeat a portion of a signal sequence such that the signal sequence is mapped to a length of a relevant subframe.

For example, in FIG. 5, a signal sequence of uplink control information having a length of '12' in an irregular subframe having a length of '5' OFDM symbols or '7' OFDM symbols, not a '6' OFDM symbol-regular subframe that can include 2×6-tile structure is mapped. In the case of transmitting uplink control information via three tile structures, 12 signal sequences from P[0] to P[11] in a first tile structure are sequentially mapped. In a second tile structure, cyclic shift is applied by as much as four, and eight signal sequences from P[4] to P[11] are sequentially mapped. Signal sequences are mapped from P[0] again by the residual required length.

When the same method is applied to a seven OFDM symbol-irregular subframe, in the first tile structure, P[0] and P[1] are transmitted one more time. In the second tile structure, P[4] and P[5] are transmitted one more time. In the third tile structure, P[8] and P[9] are transmitted one more time. Therefore, a gain may be maximized. A specific order in which a signal sequence representing uplink control channel information corresponds to a time-frequency resource, and an amount of cyclic shift of a signal sequence applied to each subcarrier group may be properly selected depending on a realization method.

The IFFT operator 640 transmits data changed into subchannels by the subchannel mapping units 630_1 to 630_N through IFFT.

As described above, in the case of transmitting uplink control information to a plurality of tile structures, when cyclic shift is differently applied for each tile structure, a portion of a signal sequence that is punctured or repeated changes, so that deterioration of reception performance may be reduced.

Figure 7:
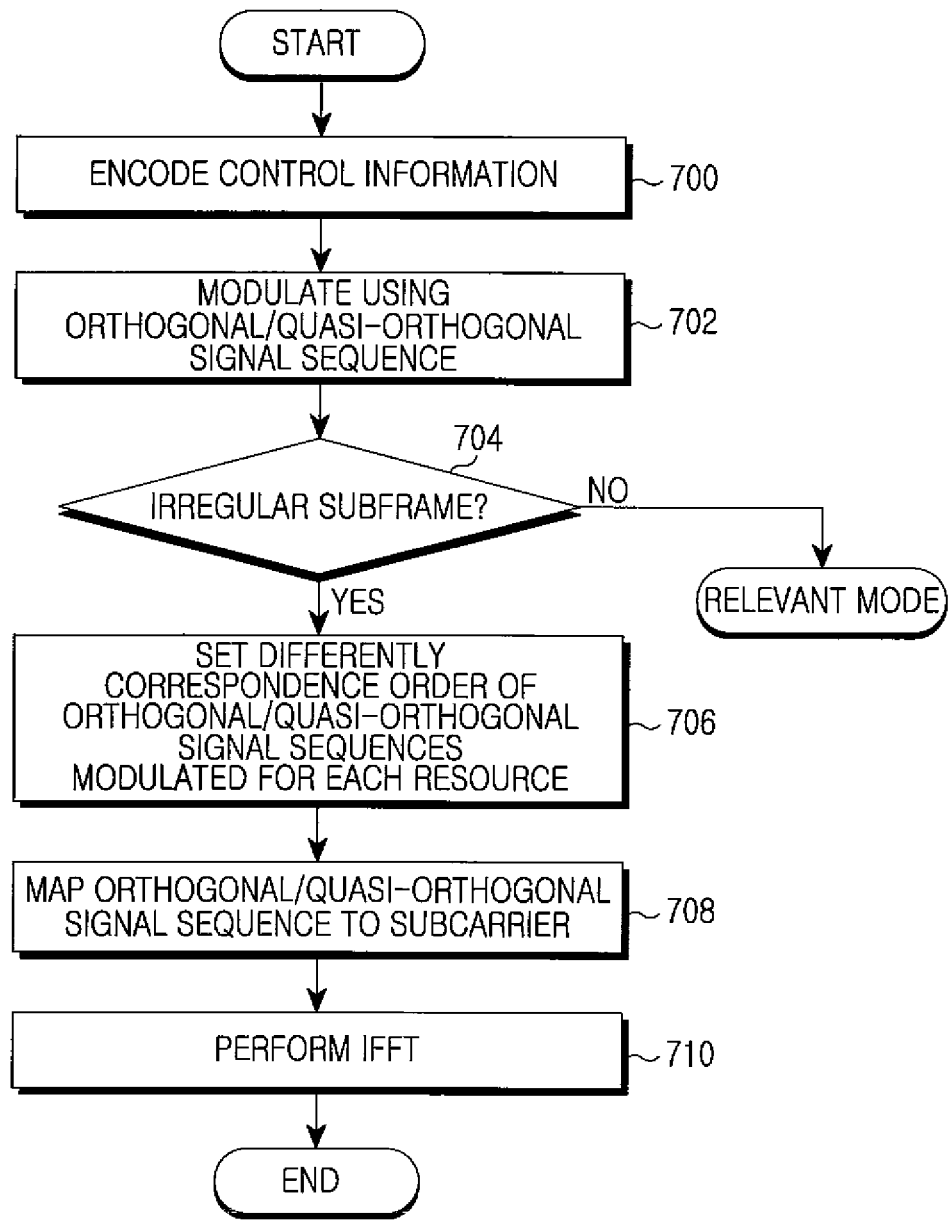
FIG. 7 illustrates a process for transmitting information via an uplink control channel in an OFDMA communication system according to an exemplary embodiment of the present invention.

FIG. 7 illustrates a method for transmitting information via an uplink control channel in an OFDMA communication system according to an exemplary embodiment of the present invention.

Referring to FIG. 7, a transmitter encodes uplink control channel information to obtain a predetermined bit in step 700, and generates an orthogonal or quasi-orthogonal signal sequence corresponding to the control channel information bit string in step 702.

When a frame is not an irregular frame in step 704, the transmitter performs an operation of a relevant mode. During the operation of the relevant mode, since a length of an orthogonal or quasi-orthogonal signal sequence corresponding to a control channel information bit string coincides with a length of a subframe of an uplink, the signal sequence does not need to be punctured or repeated.

In contrast, when a frame is an irregular frame in step 704, the transmitter cyclic-shifts the orthogonal or quasi-orthogonal signal sequence by applying different shift values in step 706. That is, the transmitter changes a start point at which a signal sequence is mapped to a subcarrier for each tile structure.

The transmitter performs an operation such that orthogonal or quasi-orthogonal signal sequences that have been cyclic-shifted in step 706 correspond to an allocated subcarrier group in step 708. At this point, the transmitter punctures or repeats a portion of a signal sequence such that the signal sequence is mapped to a length of a relevant subframe.

The transmitter transmits data changed into a subchannel through IFFT in step 710.

After that, the procedure according to an exemplary embodiment of the present invention is ended.

In FIG. 7, a subframe including six OFDM symbols is defined as a regular subframe, and a subframe including five or seven OFDM symbols is defined as an irregular subframe. A start point of a signal sequence is applied differently for each tile structure via which uplink control information is transmitted depending on whether a frame is an irregular frame. However, a start point of a signal sequence may be applied differently for each tile structure via which uplink control information is transmitted regardless of whether a frame is an irregular frame. In other words, even in the case of a regular frame, a start point of a signal sequence for each tile structure via which uplink control information is transmitted may be applied differently.

Figure 8:
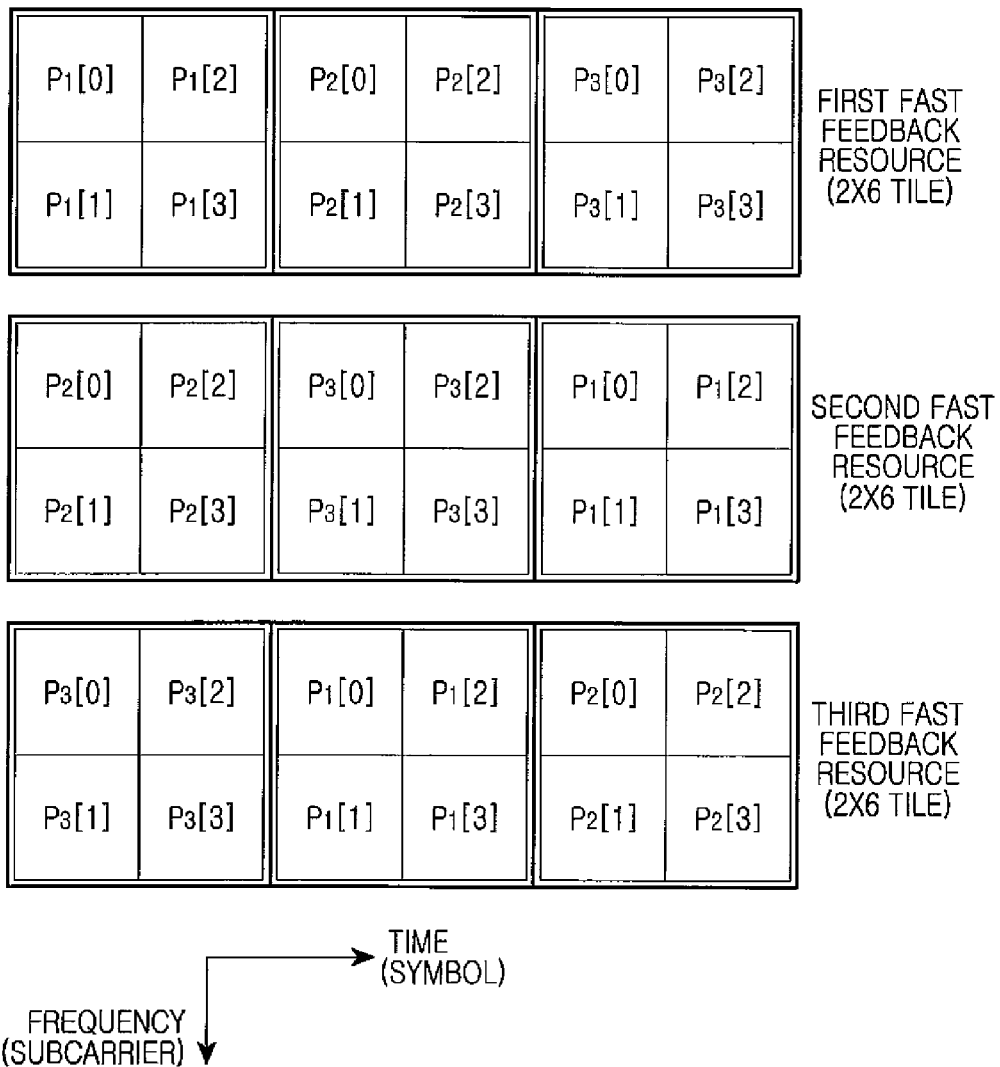
FIG. 8 illustrates an example of mapping between orthogonal subsignal sequences P1, P2, P3, and P4 whose length is 4 and a subcarrier with respect to a fast feedback resource in a 2×6 tile structure on a frequency-time axis according to an exemplary embodiment of the present invention.
Figure 9:
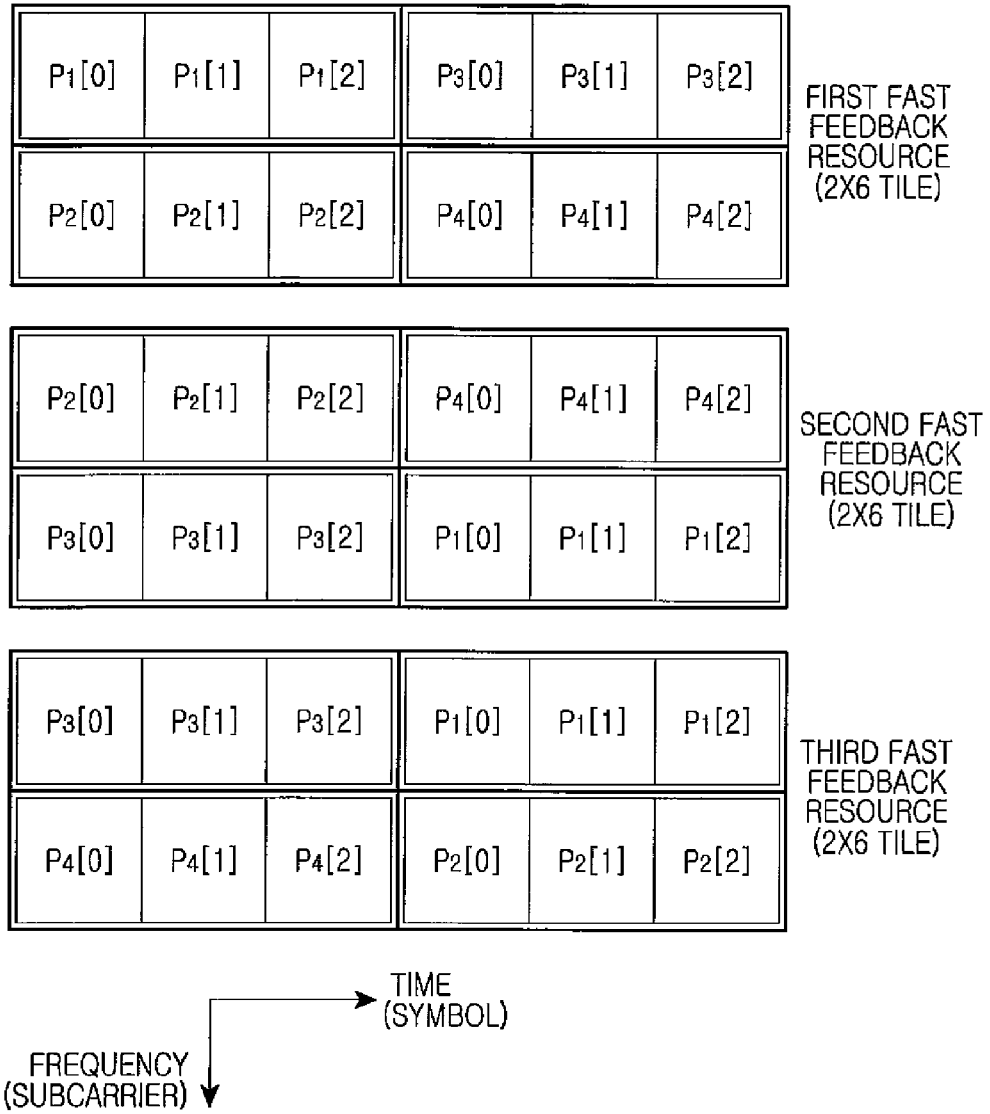
FIG. 9 illustrates an example of mapping between orthogonal subsignal sequences P1, P2, and P3 whose length is 3 and a subcarrier with respect to a fast feedback resource in a 2×6 tile structure on a frequency-time axis according to an exemplary embodiment of the present invention.

FIG. 8 illustrates an example of mapping between orthogonal subsignal sequences P1, P2, and P3 whose length is '4' and a subcarrier with respect to a fast feedback resource in a 2×6-tile structure on a frequency-time axis according to an exemplary embodiment of the present invention, and FIG. 9 is a view illustrating an example of mapping between orthogonal subsignal sequences P1, P2, P3, and P4 whose length is '3' and a subcarrier with respect to a fast feedback resource in a 2×6-tile structure on a frequency-time axis according to an exemplary embodiment of the present invention.

In FIGS. 8 and 9, all quasi-orthogonal signal sequences P1, P2, and P3, or P1, P2, P3, and P4 can achieve improved detection performance when a constant channel gain is maintained as much as possible inside a subcarrier bundle via which respective orthogonal subsignal sequences are transmitted, and a minimum phase change is maintained during a process of receiving different orthogonal subsignal sequences. To minimize this channel and phase change at a reception end, only a change sufficiently smaller than a coherence time or a coherence bandwidth, or time and frequency tolerance at the reception end is allowed. Therefore, such a characteristic needs to be met during a process of mapping respective orthogonal subsignal sequences over an allocated subcarrier bundle.

Therefore, the respective orthogonal subsignal sequences may be located adjacent such that a channel change is minimized inside the respective orthogonal subsignal sequences. For a receiver to overcome a phase difference between different orthogonal subsignal sequences even when the phase difference occurs, a correspondence order of an orthogonal subsignal sequence may be changed for each fast feedback resource. A specific correspondence order of each orthogonal subsignal sequence may be modified variously.

Figure 10:
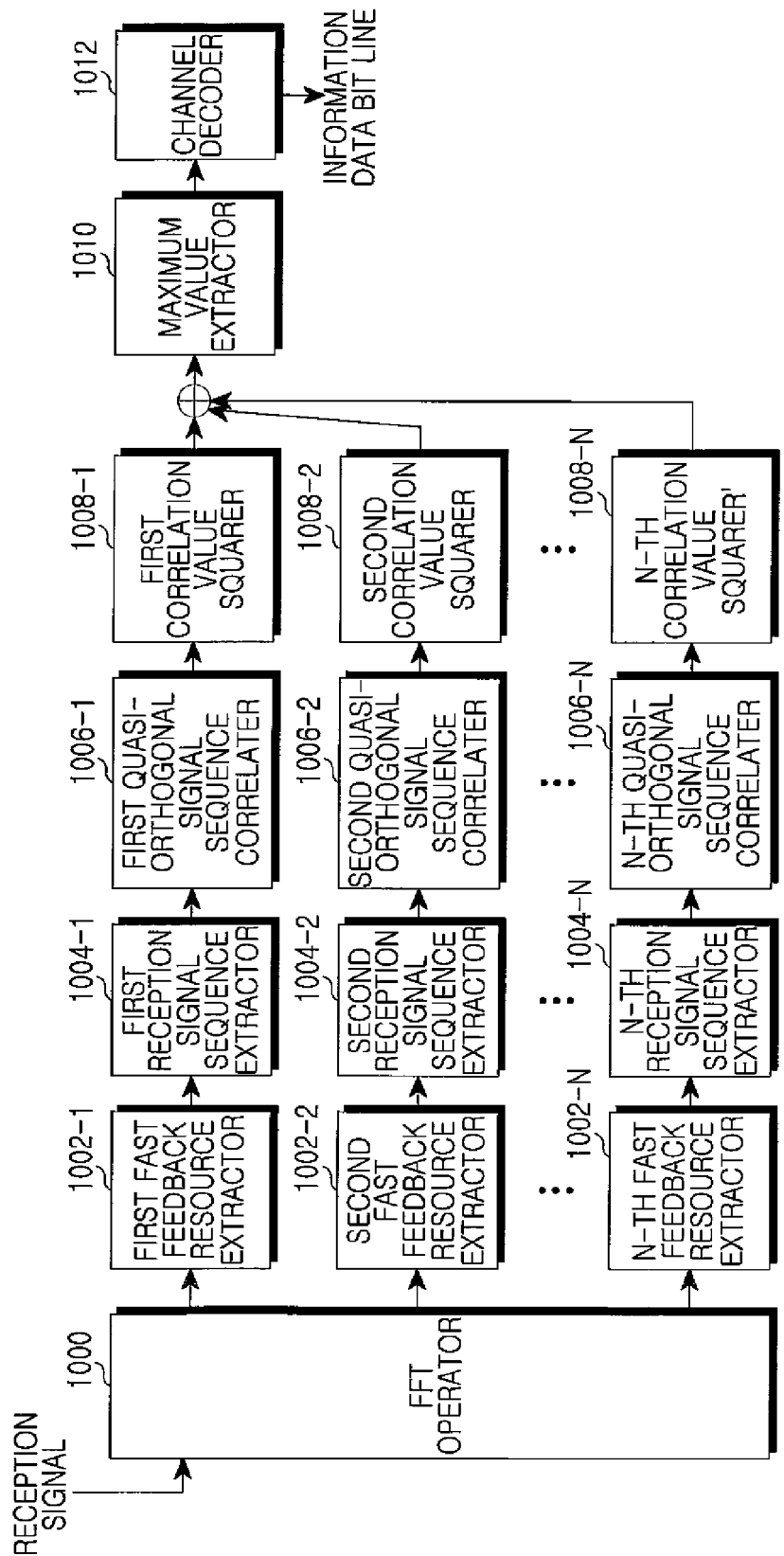
FIG. 10 illustrates a receiver that receives information via an uplink control channel in an OFDMA communication system according to an exemplary embodiment of the present invention.

FIG. 10 illustrates a receiver that receives information via an uplink control channel in an OFDMA communication system according to an exemplary embodiment of the present invention.

Referring to FIG. 10, the receiver includes an FFT operator 1000, a plurality of fast feedback resource extractors 1002_1 to 1002_N, a plurality of reception signal sequence extractors 1004_1 to 1004_N, a plurality of quasi-orthogonal signal sequence correlaters 1006_1 to 1006_N, a plurality of correlation value squarers 1008_1 to 1008_N, a maximum value extractor 1010, and a channel decoder 1012.

The FFT operator 1000 converts a reception signal in a time domain into a signal in a frequency domain by performing discrete Fast Fourier Transform (FFT).

The plurality of fast feedback resource extractors 1002_1 to 1002_N extract a reception signal of a tile structure to which fast feedback information has been transmitted depending on a location of a fast feedback resource on a time-frequency axis. For example, in FIG. 5, the fast feedback resource extractor 1002_1 extracts subcarriers of a first tile structure to which fast feedback information is transmitted from all subcarriers in the frequency domain, the fast feedback resource extractor 1002_2 extracts subcarriers of a second tile structure to which fast feedback information is transmitted from all the subcarriers in the frequency domain, and the fast feedback resource extractor 1002_3 extracts subcarriers of a third tile structure to which fast feedback information is transmitted from all the subcarriers in the frequency domain.

The plurality of reception signal sequence extractors 1004_1 to 1004_N recover a cyclic-shifted quasi-orthogonal signal sequence of fast feedback information transmitted via a relevant tile structure in an order of original quasi-orthogonal signal sequences. That is, since quasi-orthogonal signal sequences correspond to subcarriers inside each fast feedback resource in different orders, the plurality of reception signal sequence extractors 1004_1 to 1004_N recover and extract the signal sequences in the order of the original quasi-orthogonal signal sequences depending on a number of fast feedback resource and a correspondence order thereof. For example, since cyclic shift has not been applied to a quasi-orthogonal signal sequence transmitted via the first tile structure in FIG. 5, the first reception signal sequence extractor 1004_1 transfers a quasi-orthogonal signal sequence of the first fast feedback resource extractor 1002_1 to the first quasi-orthogonal signal sequence correlater 1006_1. In addition, since cyclic shift as much as '4' has been applied to a quasi-orthogonal signal sequence transmitted via the second tile structure in FIG. 5, the second reception signal sequence extractor 1004_2 recovers quasi-orthogonal signal sequences P[4], P[5], . . . P[10], P[11], P[0], and P[1] of the second fast feedback resource extractor 1002_2 to obtain signal sequences P[0], P[1], P[4], P[5], . . . P[10], and P[11], and transfers them to the second quasi-orthogonal signal sequence correlater 1006_2. Since cyclic shift as much as '8' has been applied to a quasi-orthogonal signal sequence transmitted via the third tile structure in FIG. 5, the third reception signal sequence extractor 1004_3 recovers quasi-orthogonal signal sequences P[8], . . . P[11], P[0], . . . P[5] of the third fast feedback resource extractor 1002_3 to obtain signal sequences P[0], . . . P[5], P[8], . . . P[11], and transfers them to the third quasi-orthogonal signal sequence correlater 1006_3.

Here, the plurality of reception signal sequence extractors 1004_1 to 1004_N may recognize information as to an amount of cyclic shifts of quasi-orthogonal signal sequences of a relevant tile structure by receiving the information from the transmitter, or may recognize the information according to a predetermined rule at a transmission end and a reception end even without receiving the information from the transmitter.

The plurality of quasi-orthogonal signal sequence correlaters 1006_1 to 1006_N perform correlation with all possible orthogonal or quasi-orthogonal signal sequences on recovered quasi-orthogonal signal sequences of the corresponding reception signal sequence extractors 1004_1 to 1004_N, and output them to the plurality of correlation value squarers 1008_1 to 1008_N, respectively. The plurality of correlation value squarers 1008_1 to 1008_N square correlation values of the corresponding reception signal sequence extractors 1004_1 to 1004_N.

Output values from the plurality of quasi-orthogonal signal sequence correlaters 1006_1 to 1006_N are summed and input to the maximum value extractor 1010. The maximum value extractor 1010 compares square values of respective correlater outputs, determines an orthogonal signal sequence of a correlater having a maximum value, and outputs the result to the channel decoder 1012. The decoder 1012 determines and outputs a fast feedback information bit string corresponding to the determined orthogonal signal sequence using the result from the maximum value extractor 1010.

In FIG. 10, the quasi-orthogonal signal sequence correlaters 1006_1 to 1006_N include 27, 36, or 64 parallel correlation value extractors depending on a quasi-orthogonal signal sequence used. To obtain frequency diversity from a first fast feedback resource to an N-th fast feedback resource, outputs of respective parallel correlation value extractors pass through the squarers, and squares of outputs of the correlation value extractors for the same quasi-orthogonal signal sequence are summed. It is determined that a quasi-orthogonal signal sequence of a correlation value extractor whose sum is maximized has been transmitted. A fast feedback information bit string corresponding to the determined quasi-orthogonal signal sequence is determined.

In FIG. 10, on the assumption that a quasi-orthogonal signal sequence having a length of 12 and having 64 codewords is received via three fast feedback resources, since each quasi-orthogonal signal sequence correlater requires 64 correlation extractors requiring twenty times of multiplications for each fast feedback resource, the entire receiver requires 192 parallel correlation extractors. To reduce an amount of operations, a method for separating and extracting an index and a phase difference vector of an orthogonal subsignal sequence instead of detecting all quasi-orthogonal signal sequences at a time as in FIGS. 11 and 12 may be used.

Figure 11:
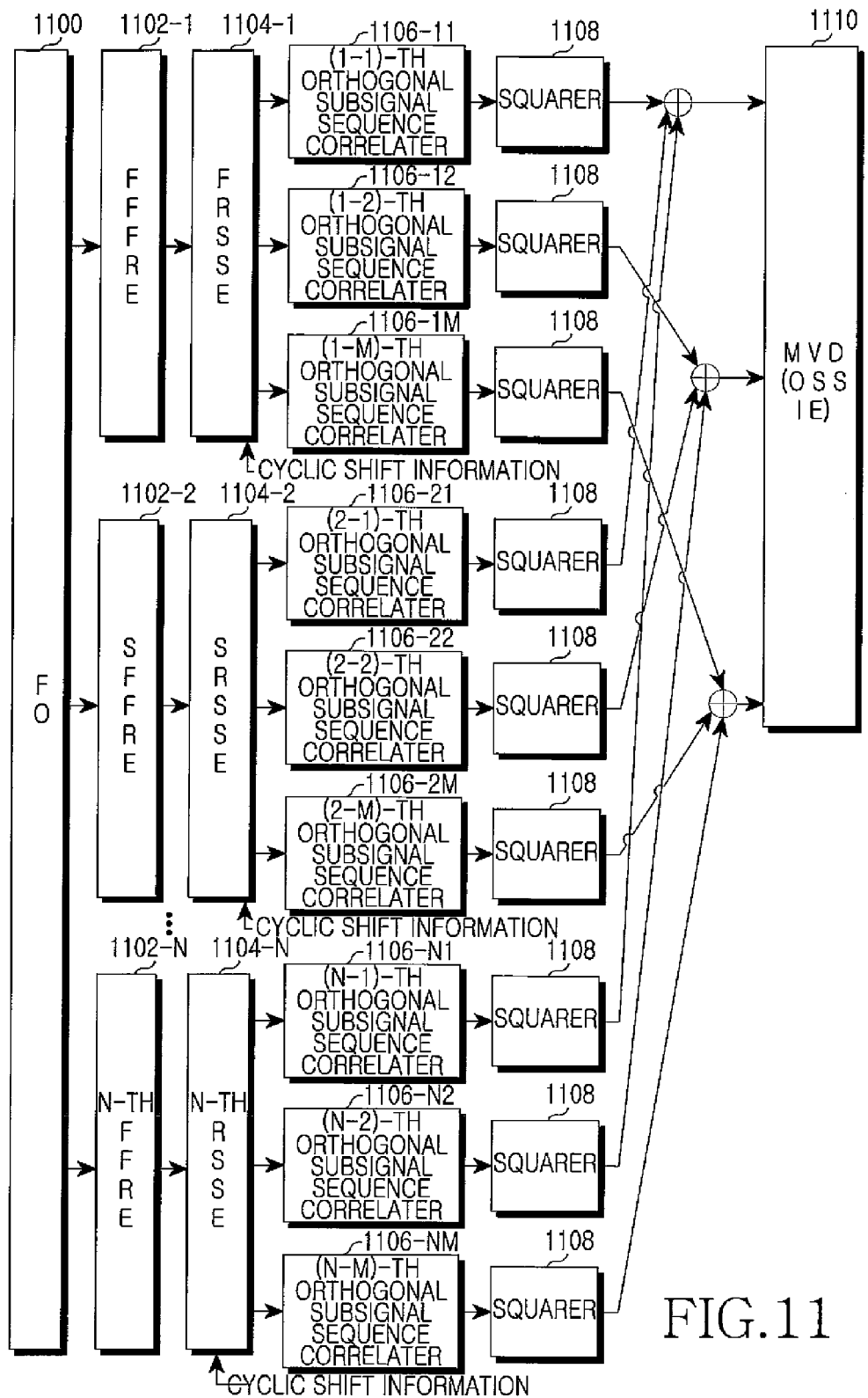
FIG. 11 illustrates a receiver that determines an orthogonal subsignal sequence index in order to receive information via an uplink control channel in an OFDMA communication system according to an exemplary embodiment of the present invention.

FIG. 11 illustrates a receiver that determines an orthogonal subsignal sequence index in order to receive information via an uplink control channel in an OFDMA communication system according to an exemplary embodiment of the present invention.

Referring to FIG. 11, the receiver includes an FFT operator (FO) 1100, a plurality of fast feedback resource extractors (FFRE) 1102_1(First FFRE) to 1102_N(N-th FFRE), a plurality of reception signal sequence extractors (RSSE) 1104_1 (First RSSE) to 1104_N (N-th RSSE), a plurality of quasi-orthogonal subsignal sequence correlaters 1106_1 to 1106_N, a plurality of squarers 1108, and a maximum value detector (MVD) (orthogonal subsignal sequence index extractor)(OSSIE) 1110.

Since the FFT operator 1100, the plurality of fast feedback resource extractors 1102_1 to 1102_N, and the plurality of reception signal sequence extractors 1104_1 to 1104_N are the same as the FFT operator 1000, the plurality of fast feedback resource extractors 1002_1 to 1002_N, and the plurality of reception signal sequence extractors 1004_1 to 1004_N in FIG. 10, detailed descriptions thereof are omitted.

In FIG. 11, a received signal sequence includes a plurality of orthogonal subsignal sequences as in FIGS. 8 and 9. Therefore, each of the signal sequence extractors 1104_1 to 1104_N separates one received signal sequence into a plurality of orthogonal subsignal sequences, and outputs the same to a correlater, and respective correlaters 1106_11 to 1106_1M, 1106_21 to 1106_2M, or 1106_N1 to 1106_NM perform separate correlation for each orthogonal subsignal sequence. That is, on the assumption that a quasi-orthogonal signal sequence having a length of twelve and having sixty-four codewords is received via three fast feedback resources, which has been used as an exemplary embodiment of the present invention, since all quasi-orthogonal signal sequences are separated into three orthogonal subsignal sequences having a length of '4', the orthogonal subsignal sequence correlaters 1106_11 to 1106_NM require four correlation extractors requiring four times of multiplications for each subsignal sequence, and thus the entire receiver requires only thirty-six parallel correlation extractors.

Figure 12:
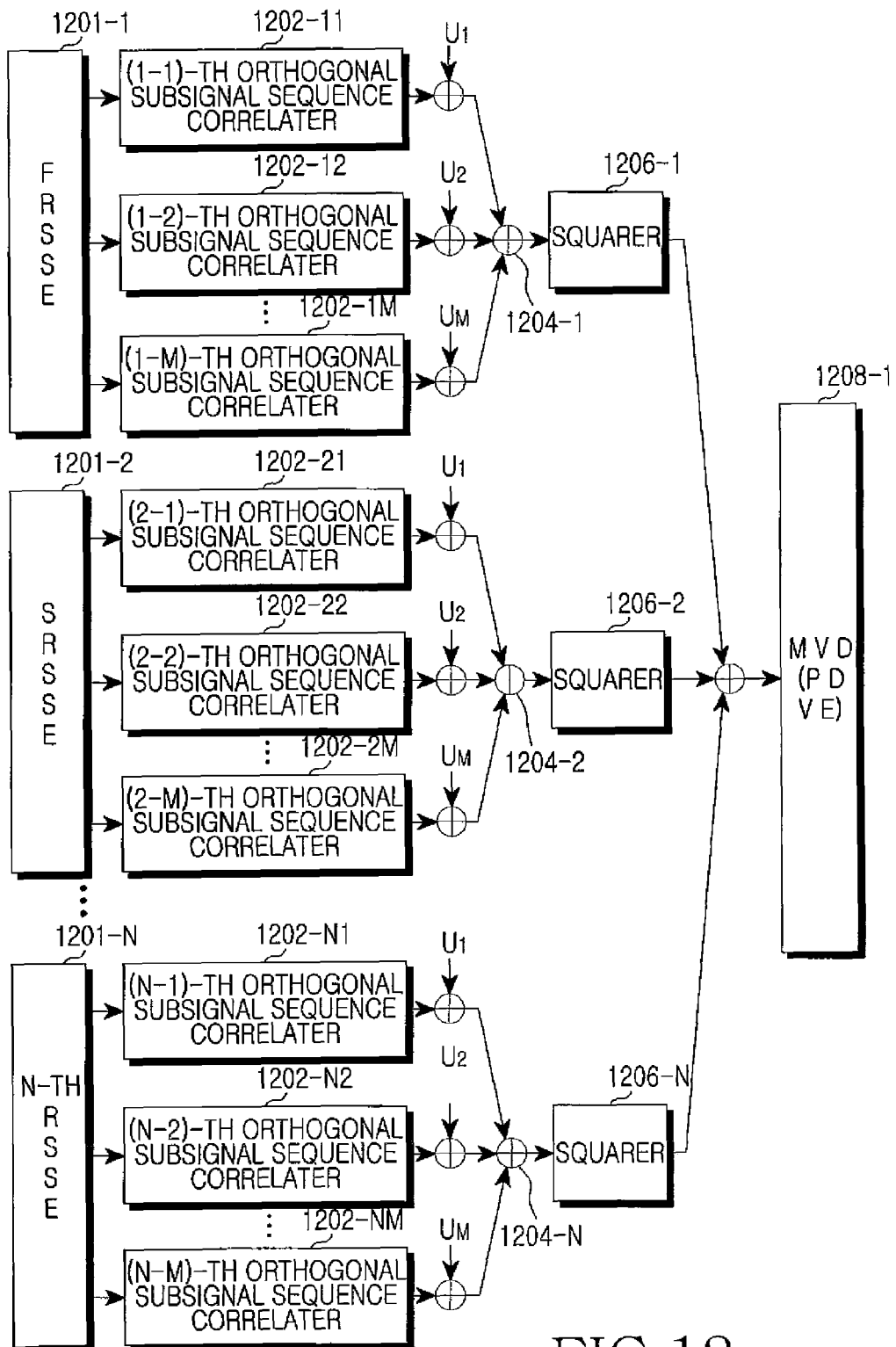
FIG. 12 illustrates a receiver that determines a phase difference vector in order to receive information via an uplink control channel in an OFDMA communication system according to an exemplary embodiment of the present invention.

Outputs of the same orthogonal subsignal sequence correlation extractors (for example, orthogonal subsignal sequence correlaters 1106_11, 1106_21, . . . 1106_N1 or orthogonal subsignal sequence correlaters 1106_12, 1106_22, . . . 1106_N2, and so forth) that have passed through different fast feedback resource extractors, and a squarer 1108 are summed. Since respective orthogonal subsignal sequences can be transmitted in the form of a selected combination as illustrated in FIGS. 8 and 9, the orthogonal subsignal sequence index extractor 1110 selects an orthogonal subsignal sequence index where sum of outputs of orthogonal subsignal sequence candidates corresponding to a relevant combination is maximum. After an orthogonal subsignal sequence index is detected, a phase difference vector is extracted using a structure illustrated in a block diagram of FIG. 12. In FIG. 12, there are a plurality of reception subsignal sequence extractors (RSSE) 1201_1(First RSSE) to 1201_N (N-th RSSE), a plurality of orthogonal subsignal sequence correlaters 1201_11 to 1201_NM206, a plurality of squarers 1206, and a maximum value detector (MVD) (phase difference vector extractor)(PDVE) 1208-1.

Outputs of the orthogonal subsignal sequence correlaters 1202_11 to 1202_NM of FIG. 12 are transmitted through, and denote only outputs of orthogonal subsignal sequence correlation value extractors corresponding to an orthogonal subsignal sequence determined in advance. Therefore, an additional correlater operation is not required, an output value of a correlater of each orthogonal subsignal sequence is multiplied by all transmittable phase difference vectors U1 to UM, sums 1204_1 to 1204_N are squared (1206_1 to 1206_N), and operations at a plurality of fast feedback resource extractors are coupled. At this point, the phase difference vector extractor 1208 determines a candidate of a phase difference vector that maximizes a sum as a phase difference vector.

Lastly, from results of the orthogonal subsignal sequence index extractor of FIG. 11 and the phase difference vector extractor of FIG. 12, a transmitted fast feedback information bit string is determined.

Figure 13:
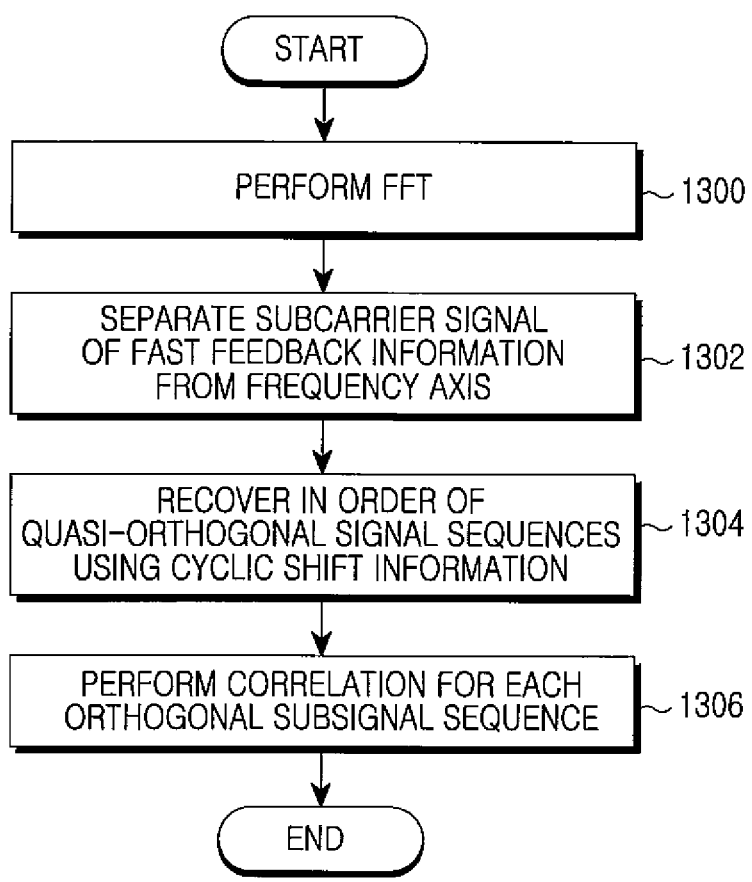
FIG. 13 illustrates a process for operating a receiver for transmitting information via an uplink control channel in an OFDMA communication system according to an exemplary embodiment of the present invention.

FIG. 13 illustrates a process for operating a receiver for transmitting information via an uplink control channel in an OFDMA communication system according to an exemplary embodiment of the present invention.

Referring to FIG. 13, the receiver converts a reception signal in the time domain into a signal in the frequency domain by performing discrete FFT in block 1300.

The receiver separates a subcarrier signal via which fast feedback information is transmitted from a frequency axis in block 1302, and recovers cyclic-shifted quasi-orthogonal signal sequences of fast feedback information transmitted via a relevant tile structure in an order of original quasi-orthogonal signal sequences using cyclic shift information (that is, a mapping point of a quasi-orthogonal signal sequence) in block 1304.

The receiver performs correlation for each quasi-orthogonal signal sequence as illustrated in FIG. 10 in block 1306. Alternatively, the receiver may perform correlation to separate and extract an index and a phase difference vector of an orthogonal subsignal sequence as illustrated in FIG. 11.

As described above, an exemplary embodiment of the present invention has an advantage of minimizing reception performance deterioration of an uplink control channel allocated to an irregular subframe by performing mapping such that a portion of a signal sequence that is punctured or repeated is different in the irregular subframe in an OFDMA communication system. In addition, a resource section to which an uplink control channel has been allocated may maintain nearly the same characteristic regardless of whether the resource section is a regular subframe or an irregular subframe.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

What is claimed is:

1. A method for operating a transmitter for transmitting information via an uplink control channel in an Orthogonal Frequency Division Multiple Access (OFDMA) communication system, the method comprising:
   encoding uplink control information to obtain a predetermined bit string;
   generating a signal sequence corresponding to the predetermined bit string;
   cyclic-shifting the signal sequence according to a predetermined rule;
   if the cyclic-shifted signal sequence is longer than an irregular subframe length, puncturing a portion of the cyclic-shifted signal sequence such that the signal sequence is suitable to be mapped to the irregular subframe length; and
   if the cyclic-shifted signal sequence is shorter than the irregular subframe length, repeating the portion of the cyclic-shifted signal sequence such that the signal sequence is suitable to be mapped to the irregular subframe length.

2. The method of claim 1, wherein the generated signal sequence is mapped to at least one tile as a different signal sequence.

3. The method of claim 1, wherein the signal sequence comprises a permutation of modulation symbols having a regular subframe length according to a predetermined modulation method, and modulation symbols are orthogonal or quasi-orthogonal.

4. The method of claim 1, wherein cyclic-shifting the signal sequence comprises:
   determining a value for a cyclic shift of the signal sequence for each tile by the following Equation:

$$C[k]=P[\mathrm{mod}(k+\mathrm{offset}*(t-1),m)]$$

where, P[k] denotes the signal sequence, C[k] denotes the signal sequence applied to a cyclic shift, k denotes index of a modulation symbol, mod [i,j] denotes a module operation that returns a remainder when i is divided by j, t demote index of tile, offset denote offset value for a cyclic shift, and m denote a size of a signal sequence mapped to a subframe, and
   mapping to the signal sequence in the each tile according to the determined value for acyclic shift.

5. The method of claim 1, the uplink control information comprises one of fast feedback information, hybrid ARQ information and bandwidth request information.

6. A method for operating a transmitter for transmitting information via an uplink control channel in an Orthogonal Frequency Division Multiple Access (OFDMA) communication system, the method comprising:
   encoding uplink control information to obtain a predetermined bit string;
   generating a signal sequence corresponding to the predetermined bit string;
   cyclic-shifting the signal sequence differently according to a plurality of tiles and mapping the signal sequence to the plurality of tiles;
   if the cyclic-shifted signal sequence is longer than an irregular subframe length puncturing a portion of the signal sequence mapped to the plurality of tiles, respectively, so that the mapped signal sequence is suitable for the irregular subframe length; and
   if the cyclic-shifted signal sequence is shorter than the irregular subframe length, repeating the portion of the signal sequence mapped to the plurality of tiles, respectively, such that the signal sequence is suitable for the irregular subframe length.

7. The method of claim 6, wherein the signal sequence comprises a permutation of modulation symbols having a regular subframe length according to a predetermined modulation method, and modulation symbols are orthogonal or quasi-orthogonal.

8. The method of claim 6, wherein a value for a cyclic shift of the signal sequence is determined according to the following Equation:

$$C[k]=P[\mathrm{mod}(k+\mathrm{offset}*(t-1),m)]$$

where, P[k] denotes the signal sequence, C[k] denotes the signal sequence applied to a cyclic shift, k denotes index of a modulation symbol, mod [i,j] denotes a module operation that returns a remainder when i is divided by j, t demote index of tile, offset denote offset value for a cyclic shift, and m denote a size of a signal sequence mapped to a subframe.

9. The method of claim 6, the uplink control information comprises one of fast feedback information, hybrid ARQ information and bandwidth request information.

10. A method for operating a transmitter for transmitting information via an uplink control channel in an Orthogonal Frequency Division Multiple Access (OFDMA) communication system, the method comprising:
    encoding uplink control information to obtain a predetermined bit string and generating a signal sequence of a regular subframe length corresponding to the predetermined bit string;
    determining whether to map the signal sequence to one of an irregular subframe and a regular subframe;
    when mapping the signal sequence to the irregular subframe, cyclic-shifting the generated signal sequence differently according to a plurality of tiles and mapping the signal sequence to the plurality of tiles; and
    if the cyclic-shifted signal sequence is longer than an irregular subframe length, puncturing a portion of the signal sequence mapped to the plurality of tiles so that the mapped signal sequence is suitable for the irregular subframe length; and,
    if the cyclic-shifted signal sequence is shorter than the irregular subframe length, repeating the portion of the signal sequence mapped to the plurality of tiles such that the signal sequence is suitable for the irregular subframe length.

11. The method of claim 10, wherein the signal sequence comprises a permutation of modulation symbols comprising a regular subframe length according to a predetermined modulation method, and modulation symbols are one of orthogonal and quasi-orthogonal.

12. The method of claim 10, further comprising, when mapping the signal sequence to the regular subframe, mapping the signal sequence to a plurality of subcarrier groups without cyclic-shifting depending upon the plurality of subcarrier groups.

13. The method of claim 10, wherein a value for a cyclic shift of the signal sequence is determined according to the following Equation:

$$C[k]=P[\mathrm{mod}(k+\mathrm{offset}*(t-1),m)]$$

where, P[k] denotes the signal sequence, C[k] denotes the signal sequence applied to a cyclic shift, k denotes index of a modulation symbol, mod [i,j] denotes a module operation that returns a remainder when i is divided by j, t demote index of tile, offset denote offset value for a cyclic shift, and m denote a size of a signal sequence mapped to a subframe.

14. The method of claim 6, the uplink control information comprises one of fast feedback information, hybrid ARQ information and bandwidth request information.

15. An apparatus for transmitting information via an uplink control channel in an Orthogonal Frequency Division Multiple Access (OFDMA) communication system, the apparatus comprising:
    a channel encoder configured to encode uplink control information to obtain a predetermined bit string;
    a signal sequence generator configured to generate a signal sequence corresponding to the predetermined bit string;
    a signal sequence cyclic shifter configured to cyclic-shift the signal sequence according to a predetermined rule; and
    a subcarrier mapping unit configured to:
       if the cyclic-shifted signal sequence is longer than an irregular subframe length, puncture a portion of the cyclic-shifted signal sequence so that the signal sequence is suitable to be mapped to the irregular subframe length, and
       if the cyclic-shifted signal sequence is shorter than the irregular subframe length, repeat the portion of the cyclic-shifted signal sequence such that the signal sequence is suitable to be mapped to the irregular subframe length.

16. The apparatus of claim 15, wherein the generated signal sequence is mapped to at least one tile as a different signal sequence.

17. The apparatus of claim 15, wherein the signal sequence comprises a permutation of modulation symbols comprising a regular subframe length according to a predetermined modulation method, and modulation symbols are one of orthogonal and quasi-orthogonal.

18. The apparatus of claim 15, wherein the signal sequence cyclic shifter determines a value for a cyclic shift of the signal sequence for each tile by the following Equation:

$$C[k]=P[\mod(k+\text{offset}*(t-1),m)]$$

where, P[k] denotes the signal sequence, C[k] denotes the signal sequence applied to a cyclic shift, k denotes index of a modulation symbol, mod [i,j] denotes a module operation that returns a remainder when i is divided by j, t demote index of tile, offset denote offset value for a cyclic shift, and m denote a size of a signal sequence mapped to a subframe, and maps to the signal sequence in the each tile according to the determined value for a cyclic shift.

19. The apparatus of claim 15, the uplink control information comprises one of fast feedback information, hybrid ARQ information and bandwidth request information.

20. A transmitter for transmitting information via an uplink control channel in an Orthogonal Frequency Division Multiple Access (OFDMA) communication system, the transmitter comprising:
  a channel encoder configured to encode uplink control information to obtain a predetermined bit string;
  a signal sequence generator configured to generate a signal sequence corresponding to the predetermined bit string;
  a plurality of signal sequence cyclic shifters configured to cyclic-shift the signal sequence differently depending upon a plurality of tiles and mapping the signal sequence to the plurality of tiles; and
  a plurality of subcarrier mapping units configured to:
  if the cyclic-shifted signal sequence is longer than an irregular subframe length, puncture a portion of the signal sequence mapped to the plurality of tiles such that the signal sequence is suitable for the irregular subframe length, and
  if the cyclic-shifted signal sequence is shorter than the irregular subframe length, repeat the portion of the signal sequence mapped to the plurality of tiles such that the signal sequence is suitable for the irregular subframe length.

21. The transmitter of claim 20, wherein the signal sequence comprises permutation of modulation symbols comprising a regular subframe length according to a predetermined modulation method, and modulation symbols are one of orthogonal and quasi-orthogonal.

22. The transmitter of claim 20, wherein a value for a cyclic shift of the signal sequence is determined according to the following Equation:

$$C[k]=P[\mod(k+\text{offset}*(t-1),m)]$$

where, P[k] denotes the signal sequence, C[k] denotes the signal sequence applied to a cyclic shift, k denotes index of a modulation symbol, mod [i,j] denotes a module operation that returns a remainder when i is divided by j, t demote index of tile, offset denote offset value for a cyclic shift, and m denote a size of a signal sequence mapped to a subframe.

23. The apparatus of claim 20, the uplink control information comprises one of fast feedback information, hybrid ARQ information and bandwidth request information.

24. The method of claim 1, further comprising:
  determining cyclic shift values for each of the tiles, wherein the cyclic shift values for each of the tiles are different.

25. The method of claim 6, further comprising:
  determining cyclic shift values for each of the tiles, wherein the cyclic shift values for each of the tiles are different.

26. The method of claim 10, further comprising:
  determining cyclic shift values for each of the tiles, wherein the cyclic shift values for each of the tiles are different.

27. The apparatus of claim 15, wherein the signal sequence cyclic shifter determines cyclic shift values for each of the tiles, wherein the cyclic shift values for each of the tiles are different.

28. The apparatus of claim 20, wherein the plurality of signal sequence cyclic shifters determine cyclic shift values for each of the tiles, wherein the cyclic shift values for each of the tiles are different.

* * * * *